(12) United States Patent
Neumann

(10) Patent No.: US 6,631,746 B2
(45) Date of Patent: Oct. 14, 2003

(54) UNDERCUT TIE BAR FOR PNEUMATIC TIRE

(75) Inventor: Aaron R. Neumann, Akron, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 77 days.

(21) Appl. No.: 09/842,077

(22) Filed: Apr. 25, 2001

(65) Prior Publication Data
US 2002/0157749 A1 Oct. 31, 2002

(51) Int. Cl.[7] .................. B60C 11/11; B60C 11/13; B60C 103/00; B60C 107/00
(52) U.S. Cl. .................. 152/209.22; 152/902
(58) Field of Search .................. 152/209.22, 209.21, 152/209.23, DIG. 3, 902

(56) References Cited

U.S. PATENT DOCUMENTS

| | | |
|---|---|---|
| 1,877,988 A | 9/1932 | Schrank |
| 2,143,528 A | 1/1939 | Thomas |
| 2,701,598 A | 2/1955 | Gray |
| 3,095,024 A | 6/1963 | Thomas |
| 3,532,147 A | 10/1970 | Gough et al. |
| 3,727,661 A | 4/1973 | Hoke |
| 3,848,651 A | 11/1974 | French |
| 4,385,654 A | 5/1983 | Sumikawa et al. |
| 4,470,443 A | 9/1984 | Eraud |
| 4,515,197 A | 5/1985 | Motomura et al. |
| 4,664,166 A | 5/1987 | Benisti |
| 4,979,549 A | 12/1990 | Kaneko |
| 5,022,448 A | 6/1991 | Ochiai |
| 5,024,260 A | 6/1991 | Ochiai |
| 5,031,680 A | 7/1991 | Kajikawa et al. |
| 5,131,444 A | 7/1992 | Kukimoto et al. |
| 5,152,854 A | 10/1992 | Matsumoto |
| 5,198,047 A * | 3/1993 | Graas et al. |
| 5,287,905 A * | 2/1994 | Caretta et al. |
| 5,297,604 A | 3/1994 | Lurois |
| 5,316,063 A | 5/1994 | Lagnier |
| 5,345,988 A | 9/1994 | Kabe et al. |
| 5,439,040 A | 8/1995 | Iwamura et al. |
| 5,503,207 A | 4/1996 | Ochiai et al. |
| 5,522,442 A | 6/1996 | Kishi |
| 5,567,253 A | 10/1996 | Iwamura |
| 5,580,404 A * | 12/1996 | Hitzky |
| 5,769,977 A | 6/1998 | Masaoka |
| 5,795,415 A | 8/1998 | Campana et al. |
| 5,851,322 A * | 12/1998 | Hayashi |
| 5,921,303 A | 7/1999 | Matsumoto |
| 5,924,464 A | 7/1999 | White |
| 5,944,082 A | 8/1999 | Thompson et al. |
| 6,012,499 A | 1/2000 | Masaoka |
| 6,343,636 B1 | 2/2002 | Hanya et al. |

FOREIGN PATENT DOCUMENTS

| | | |
|---|---|---|
| DE | 44 03 662 A | 8/1995 |
| EP | 04100706 | 4/1992 |
| EP | 0 761 479 A2 | 3/1997 |
| EP | 858875 * | 8/1998 |
| JP | 58-136502 * | 8/1983 |
| JP | 63-195006 * | 8/1988 |
| WO | WO 98 35842 A | 8/1998 |

* cited by examiner

Primary Examiner—Steven D. Maki
(74) Attorney, Agent, or Firm—Michael R. Huber; Michael Sand

(57) ABSTRACT

A pneumatic tire includes a tread having a plurality of spaced tread blocks separated by grooves or slots. A plurality of tie bars extend across the grooves or slots between adjacent tread blocks. The tie bars have a pair of sidewalls and a top surface with an undercut formed in at least one of the sidewalls to reduce tie bar stiffness and provide increased water evacuation as the tread wears. The top surface of the tie bar is lower than the top surfaces of the adjacent tread block and the undercut can be formed in only one or both sidewalls of the tie bar and have various stepped and tapered configurations.

17 Claims, 4 Drawing Sheets

UNDERCUT TIE BAR FOR PNEUMATIC TIRE

BACKGROUND OF THE INVENTION

1. Technical Field

The invention relates to pneumatic tires and in particular to pneumatic tires having tie bars extending between adjacent tread blocks which are provided with an undercut configuration.

2. Background Information

Pneumatic tires such as used for passenger vehicles and trucks, have a tread pattern which extends circumferentially about the tire. The tread consists of a plurality of circumferentially and laterally extending grooves which divide the tread into generally circumferentially extending ribs formed by a plurality of either continuous or discontinuous tread blocks. The tread blocks may be separated by lateral grooves or slots which provide for expelling water to prevent hydroplaning and provide better traction in snow and mud. However, these slots and/or grooves provide increased flexibility to the tread blocks which, for certain applications, is less desirable than stiffer tread blocks. Therefore, to increase the stiffness of the tread blocks, tie bars are formed integrally with the tread blocks and extend across the grooves and slots between adjacent tread blocks. These tie bars are molded into the tire tread and have a height usually less than the depth of the tread blocks so that a top surface of the tie bar is below the surface of the tread block and only comes into contact with the road as the tire wears. These tie bars increase the stiffness of the tread blocks which is desirable for many applications and assist in maintaining this stiffness as the tread wears to a lower depth. Thus, depending upon the location of the tie bar, it may provide noise reduction, wear reduction, decreased rolling resistance, and provide increased handling and traction for the tire.

Various tie bar constructions have been developed and utilized in many tire constructions. One example shown in U.S. Pat. No. 5,022,448 shows a tie bar which is a bridge member extending between opposed grooves. In addition, other tire constructions are provided with tapered tie bars such as shown in U.S. Pat. Nos. 2,701,598; 3,727,661; 4,515,197 and 5,439,040. However, all of these tie bars are tapered outwardly from the top surface of the tie bar to enable the tie bar to increase in width as the tread wears to assist in maintaining stiffness to the adjacent lug blocks.

SUMMARY OF THE INVENTION

The present invention provides a pneumatic tire having a plurality of tie bars extending between adjacent tread blocks which are provided with undercuts to increase wet traction of the tire as the tire wears by increasing the void areas in the grooves to assist in dispersion of water.

The undercut tie bars of the invention furthermore assist in lowering tread block stiffness when compared to non-undercut tie bars. This counteracts the natural tendency for tread blocks to stiffen as the tire wears and maintains a greater similarity in performance to that of a new tire.

Another aspect of the invention is for certain tread blocks and arrangements thereof to decrease rolling resistance.

Still another feature of the invention is the ability to provide the tie bar with various undercut configurations in order to achieve various results depending upon the particular tire and tread block construction thereof.

Another feature of the invention is to provide an undercut tie bar having one or more right-angled steps forming the undercut or providing the undercut with various sloped surfaces on one or both sides of the tie bar.

A further feature of the invention is to provide a pneumatic tire having undercut tie bars in which the tie bars are molded integrally with the tread blocks of the tire without requiring major changes in the molding process or materially increasing the costs of the tire.

Another aspect of the undercut tie bars is the ability to form the undercut facing either the outside or inside of the tire or on both sides of the tie bar, depending upon the characteristics desired to be achieved.

The foregoing advantages, construction and operation of the present invention will become more readily apparent from the following description and accompanying drawings.

BRIEF DESCRIPTION OF THE DRAWINGS

Similar numerals refer to similar parts throughout the drawings.

DESCRIPTION OF THE PREFERRED EMBODIMENTS

Figure 1:
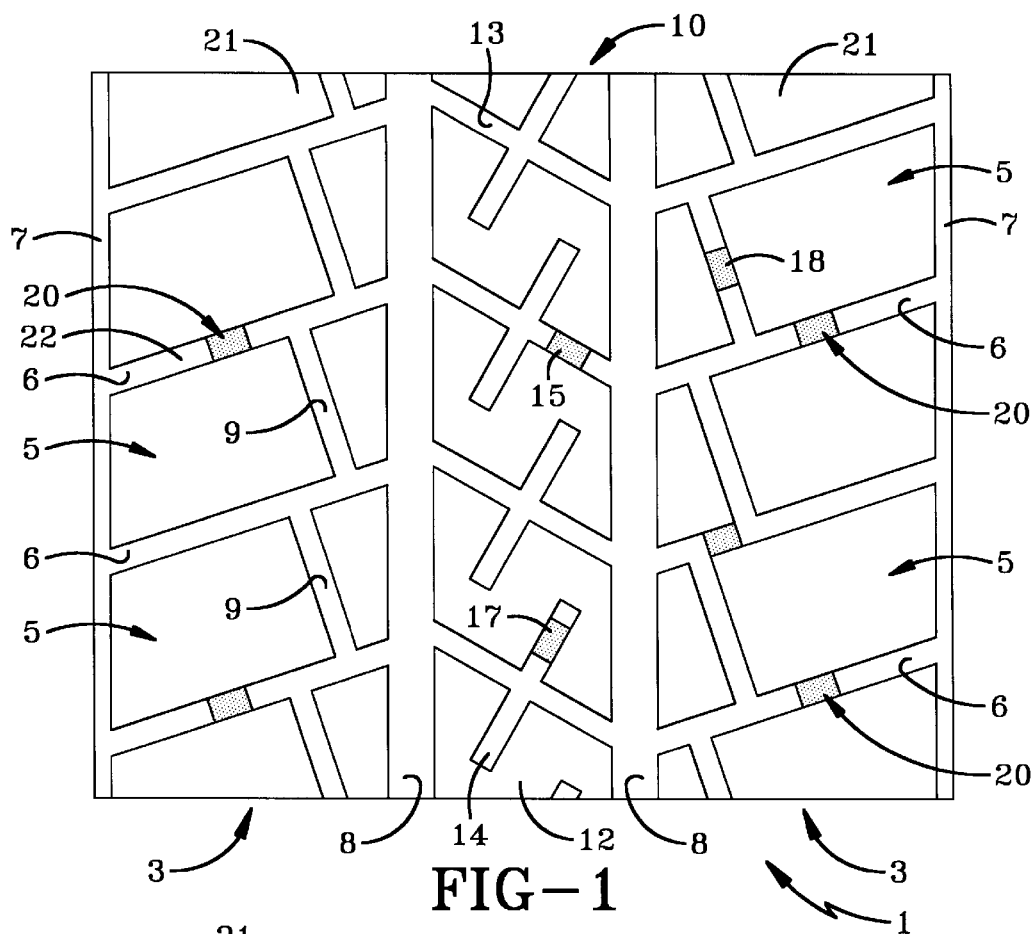
FIG. 1 is a diagrammatic plan view of a tire tread having a plurality of the undercut tie bars extending between adjacent tread blocks at various locations in the tread pattern.

FIG. 1 is a plan view of a portion of a pneumatic tire circumferential tread pattern indicated generally at 1, which includes a pair of outer ribs 3. Each rib 3 is formed by a plurality of tread blocks 5 separated by generally laterally extending grooves 6 which extend to the outside edge of the tread pattern 7. Each tread block 5 also includes a generally circumferentially extending groove 9 which extends between lateral grooves 6. A pair of circumferential central grooves 8 form a center rib 10 having a plurality of tread blocks 12 separated by generally laterally extending grooves 13 and containing generally circumferentially extending aligned slots 14. The particular rib and groove configuration of tread 1 is exemplary of only one of numerous types of tread patterns in which the undercut tie bars of the present invention can be utilized, and the invention is not limited to any particular tread pattern. The undercut tie bar of the present invention may be located at various locations in tread 1. FIG. 1 shows a plurality of tie bars 15 being located in lateral grooves 13, other tie bars 17 being located in slots 14, and still other tie bars 18 being located in grooves 9. Furthermore, a plurality of tie bars 20 are located in grooves 6, which tie bars are described in further detail below and are shown particularly in the drawing figures. However, this tie bar configuration would be equally applicable to tie bars 15, 17 and 18 and need not be limited to tie bars 20 located in the outer ribs of the tread pattern.

Figure 2:
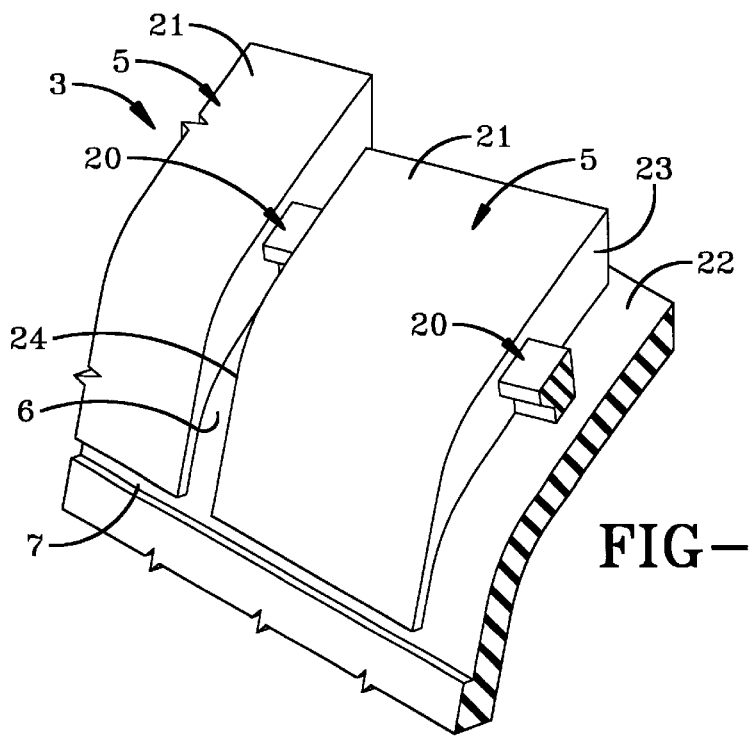
FIG. 2 is a greatly enlarged fragmentary sectional view showing two of the undercut tie bars.
Figure 3:
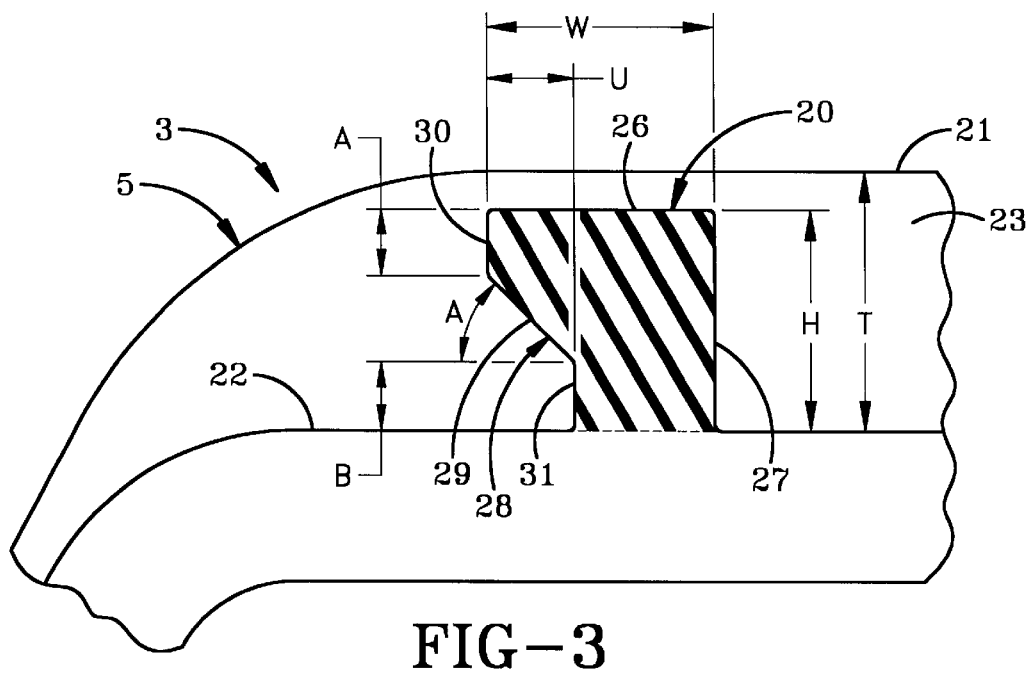
FIG. 3 is a further enlarged sectional view of a first embodiment of the undercut tie bar.

Referring particularly to FIGS. 2 and 3, each tread block 5 has a top road engaging surface 21 and opposed sidewalls 23 and 24 separated by grooves 6 which have bottom surfaces 22.

Tie bar 20 is shown in detail in FIGS. 2 and 3. Tie bar 20 includes a top surface 26 which is spaced below top surface 21 of tread block 5 and has a first vertically extending sidewall 27 extending from top surface 26 to groove bottom surface 22. In accordance with the invention, tie bar 20 is provided with an undercut sidewall 28 formed by an inwardly angled surface 29 which is located intermediate top surface 26 and bottom surface 22 and is connected thereto by vertical surfaces 30 and 31, respectively.

Tie bar 20 as shown in FIG. 3, as well as in many of the other embodiments described further below, has the following dimensional relationships. Height H is within the range of 25% and 95% of tread depth T. The width W of top surface 26 is equal to or less than the length of groove 6. Undercut angle A is between 1° and 85°, and the bottom step height B is between 0% and 25% of tie bar height H, with the upper step A having a height of between 0% and 75% of tie bar height H. The undercut width U is between 1% and 80% of tie bar width W. However, these ranges and relationships may vary without effecting the concept of the invention and are illustrative of tie bar embodiment 20.

Figure 4:
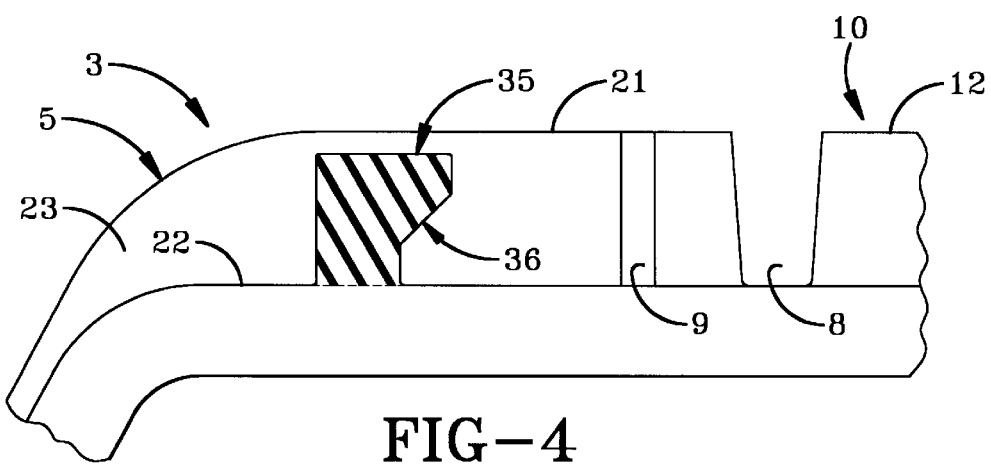
FIG. 4 is a reduced sectional view of a second embodiment.

A second embodiment of the undercut tie bar is indicated generally at 35, and is shown in FIG. 4. Tie bar 35 is very similar to tie bar 20 discussed above, with the main difference being that the undercut sidewall indicated at 36, faces towards the inside of the tire tread wherein undercut sidewall 29 of tie bar 20 faces to the outside of the tread. The remaining features of tie bar 35 are similar to those of tie bar 20 discussed above.

Figure 5:
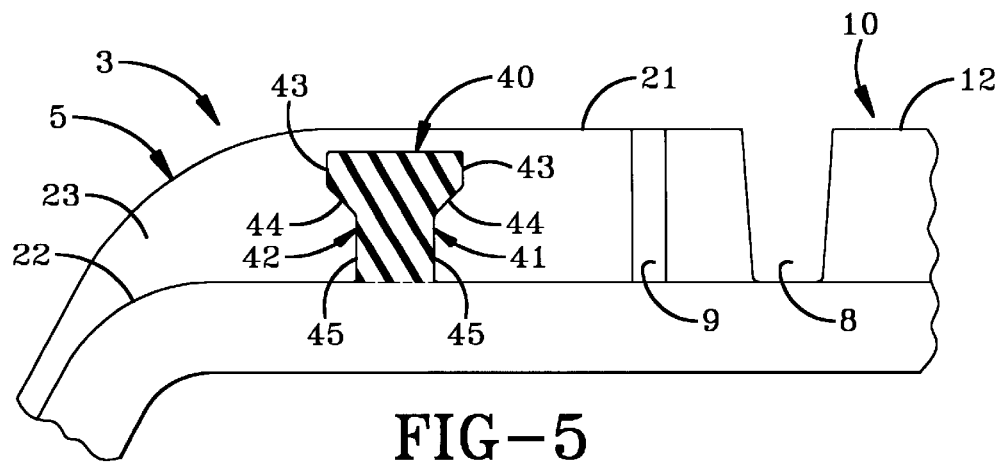
FIG. 5 is a sectional view of a third embodiment.

A third tie bar embodiment is indicated generally at 40, and is shown in FIG. 5. Tie bar 40 has two, preferably similar, undercut sidewalls 41 and 42. Each undercut sidewall is formed with an upper vertically extending surface 43, an inwardly tapered surface 44 and another vertically extending surface 45. Again, the lengths of vertical surfaces 43 and 45 can vary as well as the length and angle of inclined or tapered surface 44.

Figure 6:
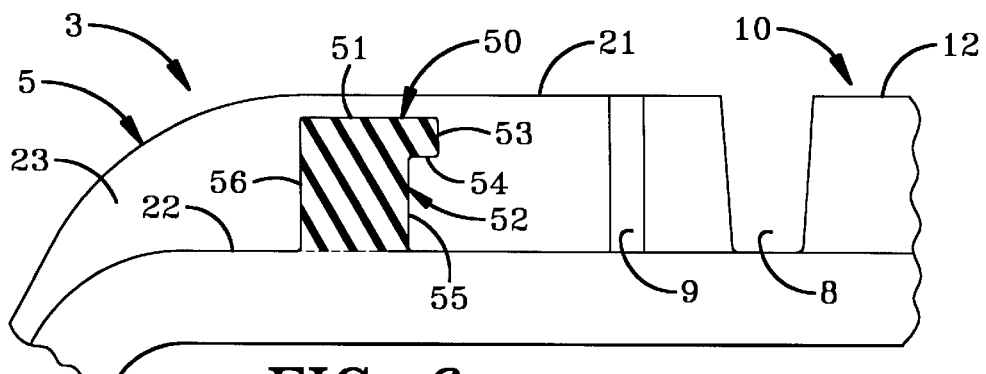
FIG. 6 is a sectional view of a fourth embodiment.

A fourth embodiment is indicated generally at 50, and shown in FIG. 6. Tie bar 50 includes a top surface 51 and an inwardly facing undercut sidewall 52 formed by a vertically extending upper surface 53, and a stepped right angle shoulder 54 which is connected to groove bottom 22 by a vertically extending surface 55. Opposite sidewall 56 extends vertically from top surface 52 to groove bottom surface 22.

Figure 7:
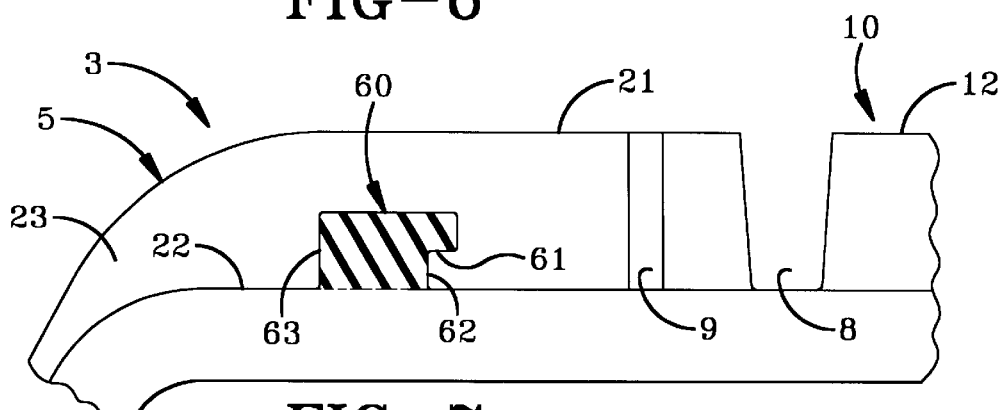
FIG. 7 is a sectional view of a fifth embodiment.

A fifth embodiment is indicated generally at 60, and is shown in FIG. 7. Tie bar 60 is generally similar to tie bar 50 in that it includes a right angled stepped shoulder 61 connected to groove bottom surface 22 by a vertical sidewall surface 62 and an opposite sidewall 63. Sidewall surface 62 is shorter than vertical sidewall surface 55 of embodiment 50. Likewise, opposite vertical sidewall 63 extends parallel with sidewall surface 62 and has a shorter height than sidewall 56 of tie bar 50.

Figure 8:
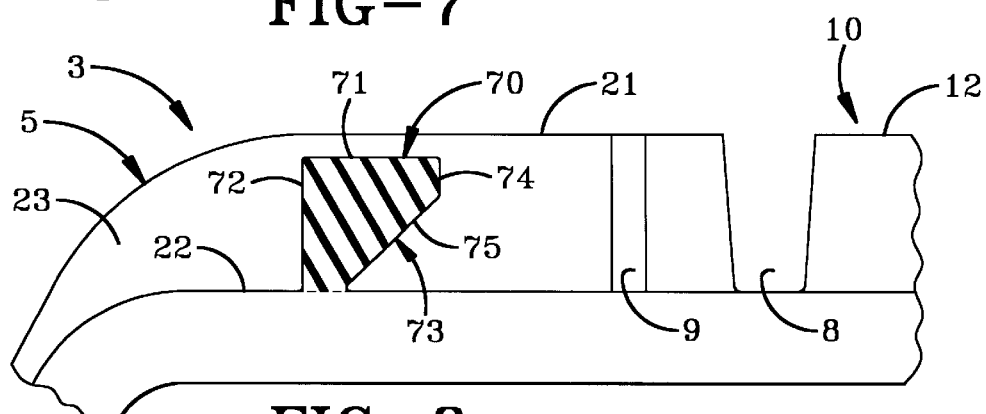
FIG. 8 is a sectional view of a sixth embodiment.

A sixth tie bar embodiment is indicated generally at 70, and is shown in FIG. 8. Tie bar 70 includes a flat top surface 71, an outwardly facing vertical sidewall 72 and an undercut inner sidewall indicated generally at 73. Undercut sidewall 73 includes a short vertical surface 74 extending downwardly from top surface 71 and an inclined surface 75 extending from vertical surface 74 completely to groove bottom surface 22.

Figure 9:
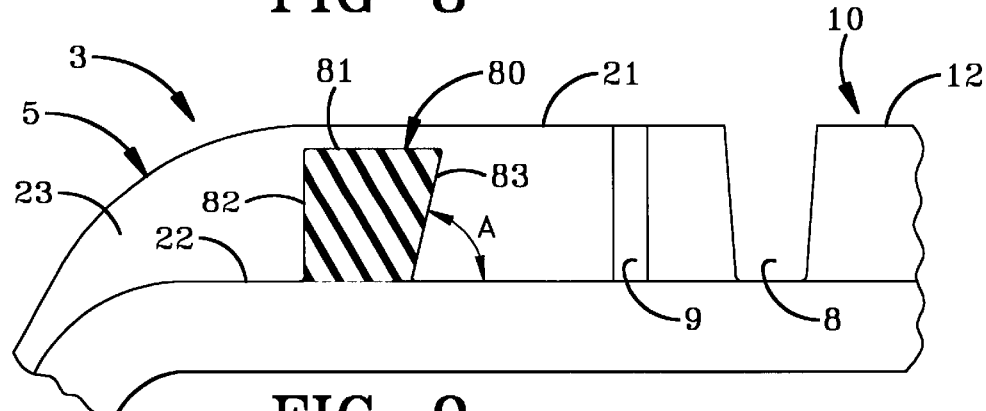
FIG. 9 is a sectional view of a seventh embodiment.

A seventh tie bar embodiment is indicated generally at 80, and is shown in FIG. 9. Tie bar 80 includes a generally flat top surface 81, a vertically extending outside wall 82 and an opposite undercut sidewall 83. Undercut sidewall 83 is a continuously sloped surface extending from top surface 81 to groove bottom surface 22. Again, angle A of sloped surface 83 can vary within the range of 1° and 85° without affecting the concept of the invention.

Figure 10:
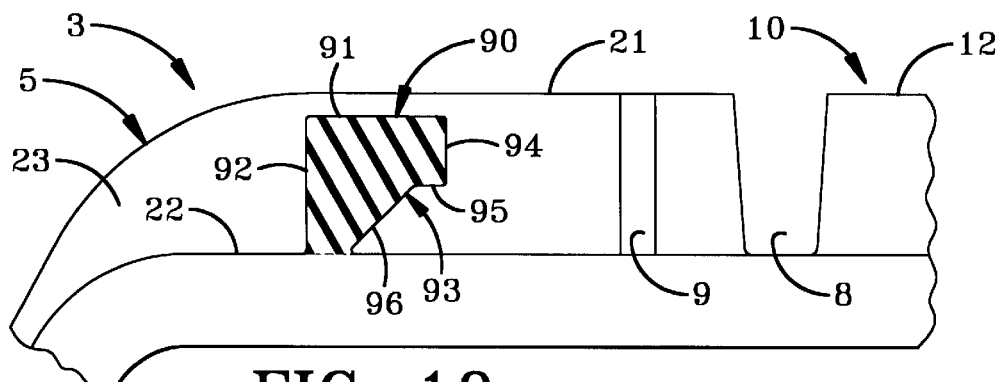
FIG. 10 is a sectional view of an eight embodiment.

An eighth tie bar embodiment is indicated generally at 90, and is shown in FIG. 10. Tie bar 90 includes a generally flat top surface 91, a vertically extending outer sidewall 92 and an undercut inner wall 93. Wall 93 is formed by a vertical top surface 94 and a right angled shoulder 95 which connects to groove bottom surface 22 by an inwardly sloped surface 96.

Figure 11:
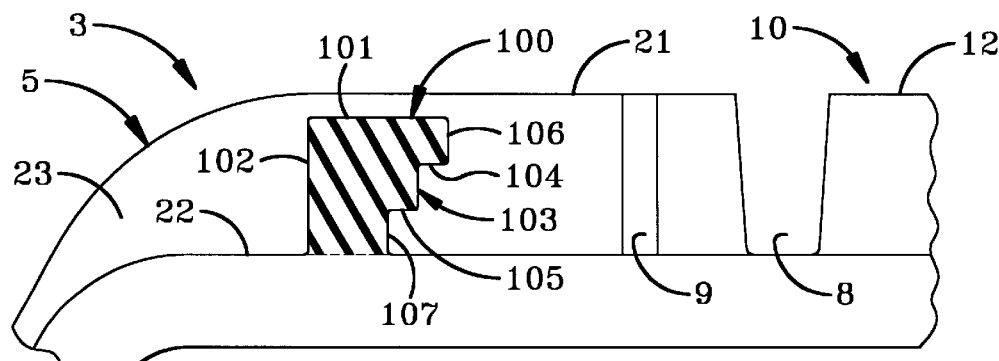
FIG. 11 is a sectional view of a ninth embodiment.

A ninth tie bar embodiment is indicated generally at 100, and is shown in FIG. 11. Tie bar 100 includes a flat top surface 101 and an outside vertical wall 102 located opposite of the undercut sidewall indicated at 103. Undercut wall 103 is formed by a pair of right angled shoulders 104 and 105 located between a pair of vertically extending surfaces 106 and 107. Again, the lengths of wall 102 and of surfaces 106 and 107 can vary depending upon the desired height of tie bar 100.

Figure 12:
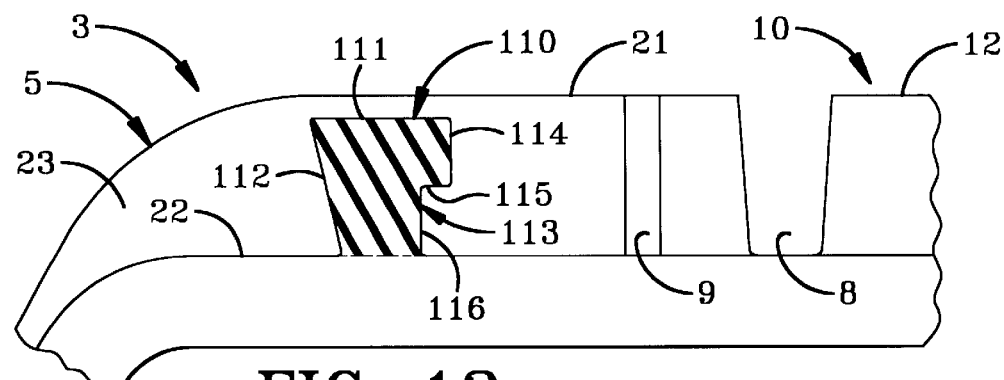
FIG. 12 is a sectional view of a tenth embodiment.

A tenth tie bar embodiment is indicated generally at 110, and is shown in FIG. 12. Tie bar 110 includes a flat top surface 111 and an inwardly inclined outside sidewall 112 located opposite of undercut sidewall 113. Undercut sidewall 113 is formed by a generally vertically extending surface 114 and a right angled shoulder 115 which connects to groove bottom surface 22 by another vertical surface 116. The angle of outside wall 112 can also vary in a similar relationship as that discussed above with respect to the undercut sidewall.

In summary, the various tie bar embodiments shown in the drawings and discussed above are representative examples of the various configurations that the tie bar can have wherein one or both sidewalls of the tie bar are inclined inwardly or provided with stepped shoulders to form for the undercut feature thereof. Again, this undercut feature provides the desired stiffness to the adjacent tread blocks yet will provide a larger void area adjacent the bottom surface of the adjacent grooves as the tie bar wears away to provide for better dispersion of water while still assisting the adjacent tread blocks to maintain their original stiffness to provide for the desired performance characteristics. Also, the various tie bar embodiments discussed above can be at the various locations in the tread pattern shown by tie bars 15, 17 and 18 in FIG. 1. Likewise, widths of the tie bars can vary considerably than that shown in the drawings and, if desired, can extend almost completely throughout the length of the groove formed between the adjacent tread blocks and need not have the relatively narrow width as shown in the drawings.

Furthermore, as shown in the drawings of the various tie bar embodiments, the top surfaces are substantially flat and parallel with the bottom surface of the adjacent groove. However, this top surface may be inclined with respect to the adjacent groove without effecting the concept of the invention.

While the embodiments of the invention have been described, the invention is not limited thereto. The claims of the invention follow.

What is claimed is:

1. A pneumatic tire having a tread extending about the outer circumference of the tire, said tread having a plurality of circumferentially extending ribs formed by a plurality of tread blocks spaced apart by a plurality of grooves extending between said tread blocks, said grooves being defined by a bottom surface and spaced sidewalls of adjacent tread blocks with certain of said grooves having a tie bar connected to and extending across the bottom surface of the groove and between the spaced pair of tread block sidewalls, each of said tie bars having a top surface spaced below top surfaces of said pair of tread blocks and a pair of sidewalls, at least one of said tie bar sidewalls being formed with an undercut.

2. The tire defined in claim 1 in which the undercut is formed by an inwardly tapered surface.

3. The tire defined in claim 2 in which the inwardly tapered surface terminates above the bottom surface of the groove.

4. The tire defined in claim 3 in which the other of said sidewalls of the tie bar is inwardly tapered from the top surface of the tie bar toward the bottom surface of the groove.

5. The tire defined in claim 2 in which the inwardly tapered surface terminates at the bottom surface of the groove.

6. The tire defined in claim 3 in which a vertically extending surface extends between the inwardly tapered surface and the top surface of said tie bar.

7. The tire defined in claim 6 in which the vertically extending surface has a length of between 1% and 75% of the height of the tie bar.

8. The tire defined in claim 3 in which a vertically extending surface extends between the inwardly tapered surface and the bottom surface of the groove.

9. The tire defined in claim 1 in which the undercut in the said one sidewall of the tie bar includes a generally right angled shoulder.

10. The tire defined in claim 9 in which the undercut further includes an inwardly sloped surface extending from the stepped shoulder toward the bottom surface of the groove.

11. The tire defined in claim 1 in which the undercut in the said one sidewall includes a pair of stepped generally right angled shoulders.

12. The tire defined in claim 1 in which a second undercut is formed in the other sidewall of the tie bar.

13. The tire defined in claim 12 in which the undercuts are symmetrical between the top surface of the tie bar and the bottom surface of the groove.

14. The tire defined in claim 1 in which the angle of the undercut is at an angle of less than 85° measured with respect to the bottom surface of the groove.

15. The tire defined in claim 1 in which the width of the top surface of the tie bar is equally to or less than the length of the groove.

16. The tire defined in claim 1 in which the height of the tie bar is in the range of 25% and 95% of the height of the sidewall of the tread block.

17. The tire defined in claim 1 in which the top surface of the tie bar is substantially flat and parallel with the bottom surface of the groove.

* * * * *